(12) United States Patent
Matteo

(10) Patent No.: US 10,614,435 B2
(45) Date of Patent: Apr. 7, 2020

(54) POINT-OF-SALE (POS) INTERFACE WRAPPING

(71) Applicant: NCR Corporation, Duluth, GA (US)

(72) Inventor: Daniel Francis Matteo, Miami Beach, FL (US)

(73) Assignee: NCR Corporation, Atlanta, GA (US)

( * ) Notice: Subject to any disclaimer, the term of this patent is extended or adjusted under 35 U.S.C. 154(b) by 0 days.

(21) Appl. No.: 15/884,800

(22) Filed: Jan. 31, 2018

(65) Prior Publication Data

US 2019/0236573 A1   Aug. 1, 2019

(51) Int. Cl.
*G06Q 20/20*   (2012.01)
*G06F 9/451*   (2018.01)
*G06F 3/0488*  (2013.01)

(52) U.S. Cl.
CPC ............ *G06Q 20/20* (2013.01); *G06F 9/452* (2018.02); *G06F 3/0488* (2013.01)

(58) Field of Classification Search
USPC .......................................................... 705/16
See application file for complete search history.

(56) References Cited

U.S. PATENT DOCUMENTS

2019/0131290 A1* 5/2019 Cho .................... G06F 17/5045
2019/0141577 A1* 5/2019 Tanake .................... H04J 1/00

* cited by examiner

*Primary Examiner* — Garcia Ade
(74) *Attorney, Agent, or Firm* — Schwegman, Lundberg & Woessner

(57) ABSTRACT

A wrapper interface is provided. The wrapper interface maps transaction and monitoring operations of a Point-Of-Sale (POS) transaction interface within an operator-facing interface. The wrapper interface also embeds a POS administrative interface within the operator-facing interface and permits interaction with administrative operations of the POS administrative interface within administrative views rendered by the POS administrative interface within the operator-facing interface.

10 Claims, 4 Drawing Sheets

POINT-OF-SALE (POS) INTERFACE WRAPPING

BACKGROUND

Each retailer often relies on their own proprietary Point-Of-Sale (POS) interface for their transaction processing because each retailer has their own specific transaction processing customizations and unique features. However, because third-party vendors offer a variety of data rich tracking, monitoring, and data integration features, the retailers often desire to integrate some of these industry-available product offerings into their POS interfaces.

This integration requires a non-substantial amount of software resources, which are usually supplied by both the retailer and the vendor. By and large, the retailer's POS interface is interacted with through a customized application supplied by the vendor with the customer-facing interface being a customized vendor interface that links between some of the native POS interface features with some features of the vendor-supplied product offering.

The customization is rarely complete and some POS interface features are not mapped and linked to the vendor's product. This is particularly true for native administrative features of the POS interface. Often what occurs is when the administrative interface needs to be accessed by a retailer, the customer-facing interface has to be exited and the native POS interface initiated to access the needed administrative features of the native POS interface.

This scenario is not ideal and processing context is often lost when the customer-facing interface is exited and the native POS interface initiated.

SUMMARY

In various embodiments, methods and a system are provided for POS interface wrapping.

According to an embodiment, a method for POS interface wrapping is provided. Specially, and in an embodiment, a Graphical User Interface (GUI) is provided that maps to a POS transaction interface for performing item transactions and transaction monitoring at a POS terminal. A POS administrative interface is rendered within the GUI when an administrative selection is activated within the GUI.

DETAILED DESCRIPTION

Figure 1:
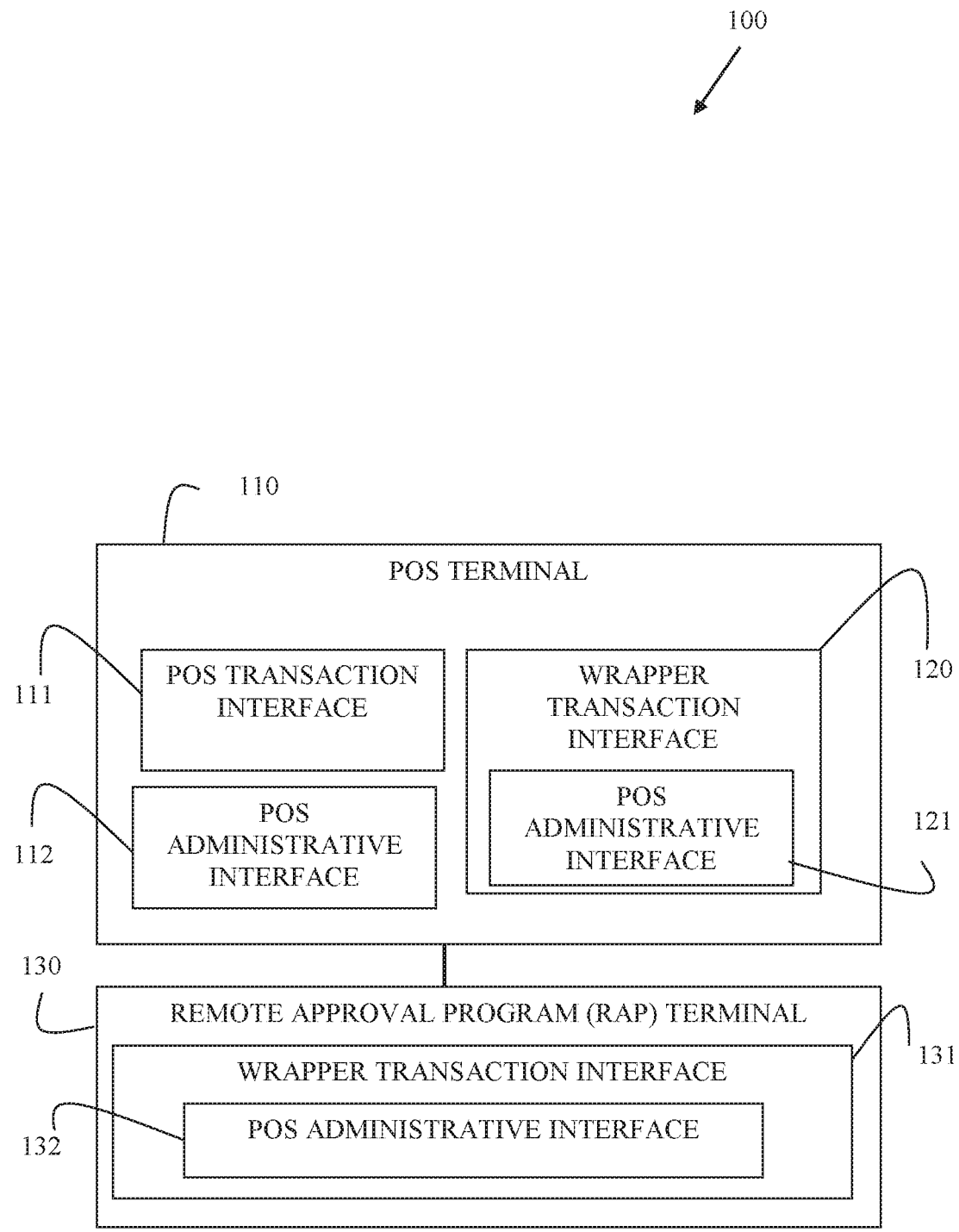
FIG. 1 is a diagram illustrating components of a POS interfacing wrapping system, according to an example embodiment.

FIG. 1 is a diagram illustrating components of a POS interfacing wrapping system, according to an example embodiment. It is to be noted that the system 100 is shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or less components are possible without departing from the teachings of POS interface wrapping techniques, presented herein and below.

Furthermore, the techniques and the systems presented herein and below (for POS interface wrapping) may include all or some combination of the components shown with the system 100. The methods are programmed as executable instructions in memory and/or non-transitory computer-readable storage media and executed on one or more processors associated with the components/devices.

Specifically, the system 100 includes a POS terminal 110 and a Remote Approval Program (RAP) terminal 130. The POS terminal 110 includes a POS transaction interface 111, a POS administrative interface 112, and a wrapper transaction interface 120. The wrapper transaction interface 120 provides a mechanism for accessing an executing instance of the POS transaction interface 121 within a processing context of the wrapper transaction interface 120. Similarly, when the POS transaction interface is accessed through the RAP terminal 130, the RAP terminal 130 includes the wrapper transaction interface 131 and an executing instance of the POS transaction interface 132.

The wrapper interface 120 and 131 provide a mechanism by which an instance of the POS interface 121 and 132 can be viewed and accessed within the operator-facing interface window associated with the wrapper interface 120 and 131.

That is, the wrapper interface 120 and 131 provides a Graphical User Interface (GUI) for an operator to access operations and workflows of the POS transaction interface 111. An Application Programming Interface (API) maps POS transaction operations and workflow sequences in the operating-facing GUI to commands recognized and supported in the wrapper interface 120 and 131. This is the customization done for transaction, monitoring, and integration processing provided by the wrapper interface 120 and 131.

However, as discussed above. This process does not include all operations and workflows available in the POS terminal 110, and this is particularly true for the POS administrative interface 112, which may need accessed by an attendant to resolve an event or condition raised on the POS terminal 110 during operation of the POS terminal 110. Typically, the wrapper interface 120 would have to be closed or hidden from view and the POS administrative interface 112 would have to be initiated and accessed into its own GUI. This is no longer the case with the embodiments presented herein.

The wrapper transaction interface 120 and 131 is provided as a callable GUI application that can be a child process to the calling program. Next, a graphical desktop sharing system (such as Virtual Network Computing (VNC®)) that permits remote control over a target computer from a source computer is modified, such that rather than an entire computer the modification permits remote control over a GUI application (window or set of windows, which may be on a same computer or on a different computer). The graphical desktop sharing system also provides for relaying of a source's graphical display and mouse events. This is modified as well, such that the mouse events are translated into touch screen events since the POS terminal 110 includes a touchscreen display events instead of mouse-initiated events.

To ensure that touch events and screen presentations of the POS administrative interface instances 121 and 132 works in a loopback mode from within the wrapper transaction interface 120 and 131 to communicate the events for processing to the executing instances of the POS administrative interface instances 121 and 132.

The modified graphical desktop sharing system also requires the POS administrative interface instances 121 and 132 to be executing but the instances 121 and 132 should not be visible on the POS terminal 110 or the RAP terminal 130 when the wrapper interface 120 and 131 are performing normal transaction and monitoring functions for the POS terminal 110.

To accomplish this invisibility of the POS administrative interface instances 121 and 132 until an operator actually activates the POS administrative interface 112, a virtual secondary display (or tertiary in a dual display POS terminal 110 or RAP terminal 130) display is created. The instances 121 and 132 are executed and visible within this virtual display but only brought into focus within the operator-facing interface of the wrapper interface 120 and 131 when the operator activates an option to access the administrative interface 112 from within a processing context and window of the operator-facing interface window of the wrapper interface 120 and 131. So, until activated by an operator, the POS administrative interface instances 121 and 132 remain hidden from view but are visible to the modified graphical desktop sharing system. In Operating System (OS) environments where a virtual display is unsupported, a virtual display driver is created to accomplish the virtual display functionally. In some instances, the OS display driver model is modified to achieve the virtual display functionality.

During operation of the wrapper interface 120 and 131, the operator-facing interface and related GUI screens and options are provided to the operator for transaction and monitoring related operations. When an event is detected requiring an operator to access the administrative interface 112, the operator selects and option to access the administrative interface from within one of the GUI screens associated with the operator-facing interface. This activates the modified graphical desktop sharing application and the GUI screens and interfaces operations associated with the executing instances 121 and 132 are brought into focus and accessible to the operator through the operating-facing interface. Touch events are relayed to the instances 121 and 132 and processed to change or provide information back from the instances 121 and 132 within the operator-facing interface screen that includes the interface screens of the administrative interface 112.

The wrapper interface 120 and 131 provide a mechanism for embedding a completely different administrative interface 112 within a GUI screen of operator-facing interface. The embedded interface instances 121 and 132 can be interacted with and processed. The interactions are passed as touch events for processing by the instances 121 and 132. So, the operator-facing interface becomes a virtual GUI container for the administrative interface 112; virtual because the instances 121 and 132 execute outside of the execution context of the operator-facing interface but completely capable of being interacted with and being viewed because of the screen and event passing from the operator-facing interface to the instances 121 and 132.

All native interface screens and operations available in the administrative interface 112 are available to the operator within the operator-facing interface of the wrapper interface 120. Thus, there is no need to exist the wrapper interface 120 by the operator when the administrative interface 112 needs to be accessed and the context of the where the wrapper interface 120 was at remains available to the operator.

The system 100 provides an automatic mechanism to integrate a POS administrative interface 112 within the wrapper interface 120 and 131; thereby alleviating weeks or months of development work that would have otherwise been required to achieve such integration with custom programming. This is accomplished by modifying a graphical desktop sharing system to support window or application-based remote control rather than computer-based control and to translate mouse events to touch events (as discussed above). This is also accomplished by executing the instances 121 and 132 in a manner that is invisible to the operator of the POS terminal 110 or RAP terminal 130 but visible to the modified graphical desktop sharing system (through a virtual display, a modified display driver, and or changes to an OS's display driver).

It is noted that two instances 121 and 132 were depicted because the administrative interface 112 integration can be achieved on the POS terminal 110 or through network remoting via the RAP terminal 130.

In an embodiment, the POS terminal 110 is a terminal that is operated by an attendant on behalf of a customer performing item checkout at the POS terminal 110.

In an embodiment, the POS terminal 110 is a Self-Service Terminal (SST) that is operated by a customer during item checkout.

In an embodiment, the operator is a customer or an attendant performing item checkout at the POS terminal 110 for performing operations associated with the POS transaction interface through the wrapper interface 120.

In an embodiment, the operator is an attendant or administrator for performing operations associated with the administrative interface 112. The attendant or administrator can access the administrative interface 112 from the POS terminal 110 or the RAP terminal 130.

The above discussed embodiments and other embodiments are now discussed with reference to the FIGS. 2-4.

Figure 2:
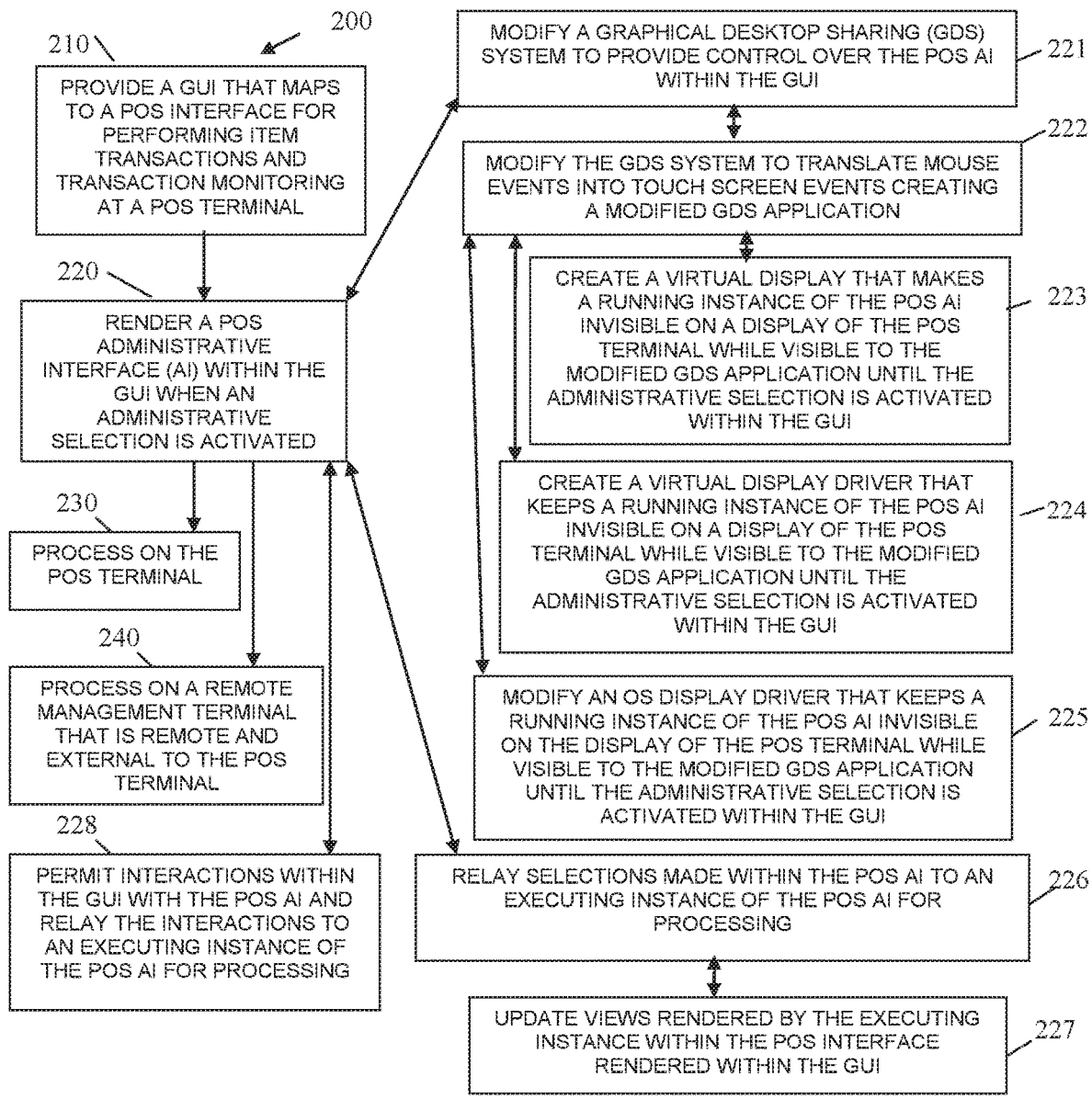
FIG. 2 is a diagram of a method for POS interface wrapping, according to an example embodiment.

FIG. 2 is a diagram of a method 200 for POS interface wrapping, according to an example embodiment. The software module(s) that implements the method 200 is referred to as a "POS wrapper interface." The POS wrapper interface is implemented as executable instructions programmed and residing within memory and/or a non-transitory computer-readable (processor-readable) storage medium and executed by one or more processors of a device. The processor(s) of the device that executes the POS wrapper interface are specifically configured and programmed to process the POS wrapper interface. The POS wrapper interface may have access to a network during its processing. The network can be wired, wireless, or a combination of wired and wireless.

In an embodiment, the device that executes the POS wrapper interface is the POS terminal 110 and the POS wrapper interface is the wrapper 121. In an embodiment, the POS terminal 110 is a cashier or attendant-assisted terminal. In an embodiment, the POS terminal 110 is a SST.

In an embodiment, the device that executes the POS wrapper interface is the RAP terminal 130 and the POS wrapper interface is the wrapper 132.

At 210, the POS wrapper interface provides a GUI that maps functionality (operations and processing sequence work flows for the operations) from a vendor supplied operating-facing interface to a native POS interface for performing item transactions and transaction monitoring at a POS terminal or remotely from a remote monitoring terminal (RAP terminal 130).

At 220, the POS wrapper interface renders a native POS administrative interface within the GUI when an administrative selection is activated from within the operating-facing interface. The POS administrative interface is rendered and accessible from within one or more screens of the GUI.

In an embodiment, at 221, the POS wrapper interface modifies a graphical desktop sharing system (such as a modified VNC system) to provide control over the POS administrative interface from within the GUI (within the operating-facing interface of the GUI).

In an embodiment of 221 and at 222, the POS wrapper interface modifies the graphical desktop sharing system to translate mouse events into touch screen events creating a modified graphical desktop sharing application. That is, the modified graphical desktop sharing application recognizes touch screen events within the POS administrative interface when activated by an operator from within the operator-facing interface.

In an embodiment of 222 and at 223, the POS wrapper interface creates a virtual display than makes a running instance of the POS administrative interface invisible on a display of the POS terminal while visible to the modified graphical desktop sharing application until the administrative selection is activated within the GUI (within the operating-facing interface portion of the GUI).

In a different embodiment of 222 and at 224, the POS wrapper interface creates a virtual display driver that keeps a running instance of the POS administrative interface invisible on a display of the POS terminal while visible to the modified graphical desktop sharing application until the administrative selection is activated within the GUI (within the operator-facing interface portion of the GUI).

In still another embodiment of 222 and at 225, the POS wrapper interface modifies an OS display driver that keeps a running instance of the POS administrative interface invisible on a display of the POS terminal while visible to the graphical desktop sharing application until the administrative selection is activated within the GUI (within the operator-facing interface portion of the GUI).

It is noted that the embodiments 223-225 are selected based on the operating environment of the POS terminal or a remote management terminal (such as RAP terminal 130). That is, depending upon what the OS is and what is supported by that OS a selection is made for embodiments 223-225.

In an embodiment, at 226, the POS wrapper interface relays selections made within the POS administrative interface by an operator to an executing instance of the POS administrative interface for processing.

In an embodiment of 226 and at 227, the POS wrapper interface updates views rendered by the executing instance within the POS interface that is rendered within the GUI (the operating-facing portion of the GUI).

In an embodiment, at 228, the POS wrapper interface permits interactions with the operator-facing portion of the GUI with the POS administrative interface and relays the interactions to an executing instance of the POS administrative interface for processing.

According to an embodiment, at 230, the POS wrapper interface is processed on the POS terminal.

In an embodiment, at 240, the POS wrapper interface is processed on a remote management terminal that is remote and external to the POS terminal, such as the RAP terminal 130.

Figure 3:
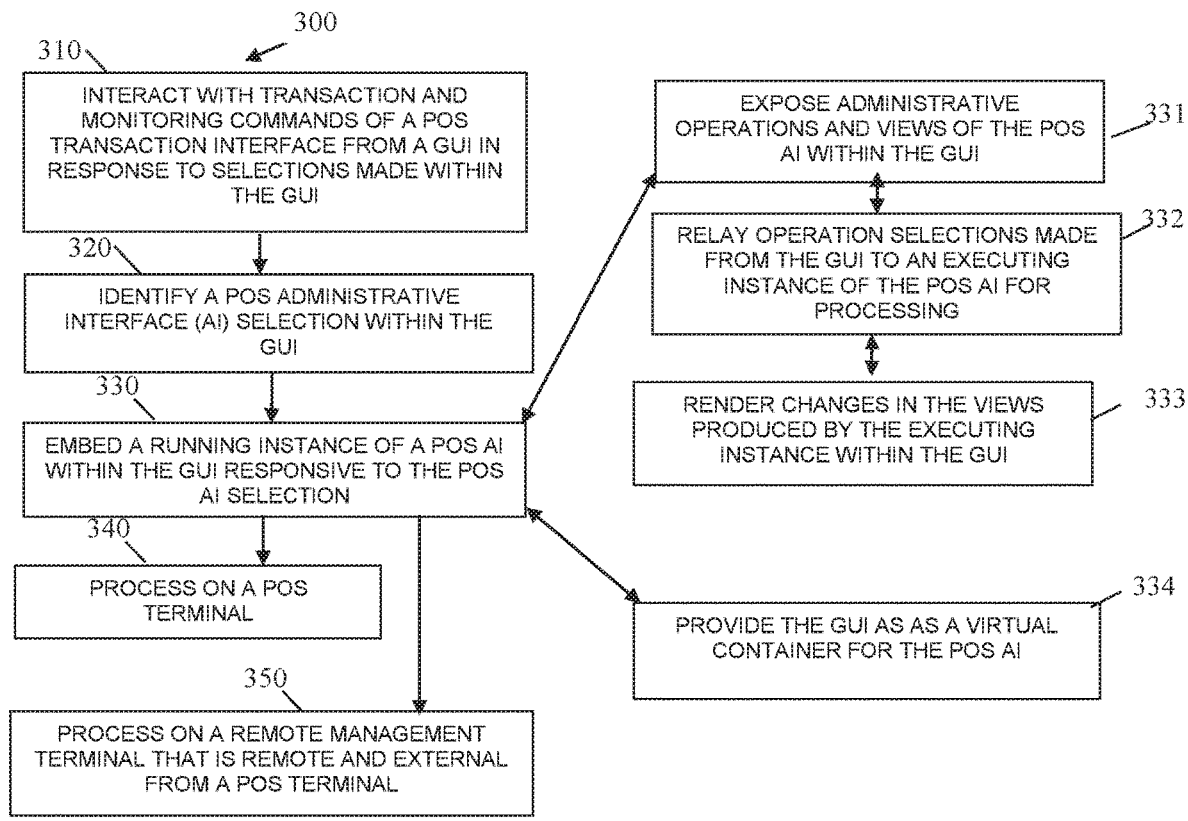
FIG. 3 is a diagram of another method for POS interface wrapping, according to an example embodiment.

FIG. 3 is a diagram of another method 300 for POS interface wrapping, according to an example embodiment. The software module(s) that implements the method 300 is referred to as an "interface integrator." The interface integrator is implemented as executable instructions programmed and residing within memory and/or a non-transitory computer-readable (processor-readable) storage medium and executed by one or more processors of a hardware device. The hardware processors that execute the interface integrator are specifically configured and programmed to process the interface integrator. The interface integrator may have access to one or more networks during its processing. Each network can be wired, wireless, or a combination of wired and wireless.

The interface integrator presents another and in some ways enhanced processing perspective of the FIG. 2.

In an embodiment, the device that executes the interface integrator is the POS terminal 110 and the interface integrator is the wrapper 121. In an embodiment, the POS terminal 110 is a cashier or attendant-assisted terminal. In an embodiment, the POS terminal 110 is a SST.

In an embodiment, the device that executes the interface integrator is the RAP terminal 130 and the interface integrator is the wrapper 132.

In an embodiment, the interface integrator is the method 200.

At 310, the interface integrator interacts with transaction and monitoring commands of a POS transaction interface from a GUI in response to selections made within the GUI. The GUI representing an operator-facing interface to the POS transaction interface.

At 320, the interface integrator identifies a POS administrative interface selection that is made within the GUI.

At 330, the interface integrator embeds a running instance of a POS administrative interface within the GUI responsive to the POS administrative interface selection.

In an embodiment, at 331, the interface integrator exposes administrative operations and views of the POS administrative interface within the GUI.

In an embodiment of 331 and at 332, the interface integrator relays operation selections from within the GUI to an executing instance of the POS administrative interface for processing by the executing instance.

In an embodiment of 332 and at 333, the interface integrator renders changes in views produced by the executing instance within the GUI.

In an embodiment, at 334, the interface integrator provides the GUI as a virtual container for the POS administrative interface. That is visually and from an interaction standpoint, the POS administrative interface appears to be processing as part of the GUI and within a screen of the GUI but the executing instance of the POS administrative interface is processing outside the context of the GUI.

According to an embodiment, at 340, the interface integrator processes on a POS terminal.

In an embodiment, at 350, the interface integrator processes on a remote management terminal (such as the RAP terminal 130) that is remote and external from a POS terminal.

Figure 4:
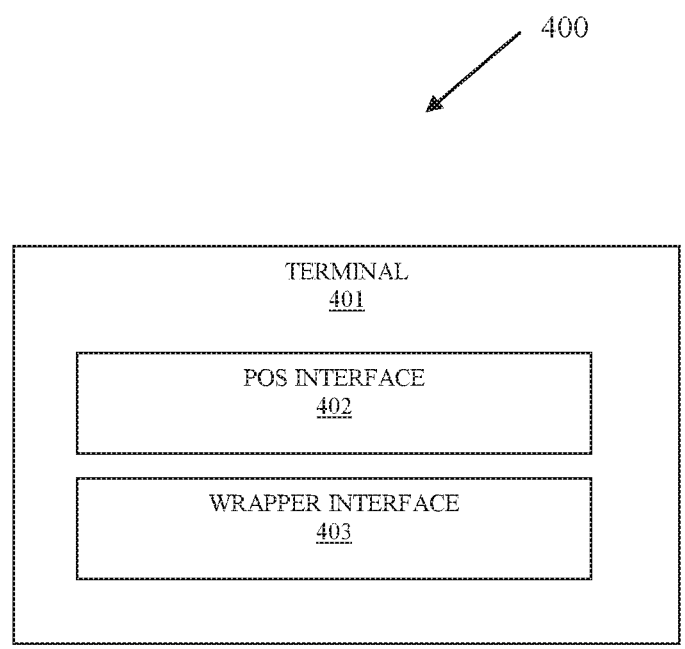
FIG. 4 is a diagram of a system for POS interface wrapping, according to an example embodiment.

FIG. 4 is a diagram of system POS interface wrapping, according to an example embodiment. Some components of the system 400 are programmed and reside within memory and/or a non-transitory computer-readable medium and execute on one or more processors of the system 400 and/or integrated peripheral devices of a terminal 401. The system 400 communicates over one or more networks, which can be wired, wireless, or a combination of wired and wireless.

In an embodiment, the system 400 is the system 100.

In an embodiment, the terminal 401 is a POS terminal that performs cashier or attendant-assisted checkout transactions.

In an embodiment, the terminal 401 is a SST that performs self-assisted checkout transactions.

In an embodiment, the system 400 implements, among other things, the processing discussed in the FIGS. 1-3.

The system 400 includes a terminal 401, an instance of a POS interface 402, and a wrapper interface 403.

In an embodiment, the instance of the POS interface 402 is the instance 121 or 132.

In an embodiment, the wrapper interface 403 is one of or some combination of: the wrapper 120, the wrapper 131, the method 200, and/or the method 300.

The wrapper interface 403 is configured to: 1) execute on at least one processor of the terminal 401, 2) execute transaction and monitoring operations provided in an operator facing GUI with the POS interface 402, ii) render a POS administrative interface associated with the POS interface 402 within the GUI when an administrative selection is made within the GUI, iii) relay selections made within a portion of the GUI that renders the POS administrative interface to an executing instance of the POS administrative interface 402 for processing; and iv) update views of the POS administrative interface 402 within the GUI based on processing performed by the executing instance.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
    providing, by executable instructions that execute on a processor of a Point-Of-Sale (POS) terminal from a non-transitory computer-readable storage medium, a Graphical User Interface (GUI) that maps to a POS interface for performing item transactions and transaction monitoring at the POS terminal; and
    rendering, by the executable instructions, a POS administrative interface within the GUI when an administrative selection is activated within the GUI, wherein rendering further includes bringing the POS administrative interface into focus within a window of the GUI upon the administrative selection, and translating touch events triggered by touches within the window to mouse events recognized by the POS administrative interface, wherein rendering further includes rendering the POS administrative interface while an executing instance of the POS interface is processing within the GUI and performing a transaction at the POS terminal.

2. The method of claim 1 further comprising, processing the method on the POS terminal.

3. The method of claim 1, wherein rendering further includes modifying a graphical desktop sharing system to provide control over the POS administrative interface within the GUI.

4. The method of claim 3, wherein modifying further includes modifying the graphical desktop sharing system to translate the mouse events into the touch screen events creating a modified graphical desktop sharing application.

5. The method of claim 4, wherein modifying further includes creating a virtual display that makes a running instance of the POS administrative interface invisible on a display of the POS terminal while visible to the modified graphical desktop sharing application until the administrative selection is activated within the GUI.

6. The method of claim 4, wherein modifying further includes creating a virtual display driver that keeps a running instance of the POS administrative interface invisible on a display of the POS terminal while visible to the modified graphical desktop sharing application until the administrative selection is activated within the GUI.

7. The method of claim 4, wherein modifying further includes modifying an Operating System (OS) display driver that keeps a running instance of the POS administrative interface invisible on a display of the POS terminal while visible to the modified graphical desktop sharing application until the administrative selection is activated within the GUI.

8. The method of claim 1, wherein rendering further includes relaying selections made within the POS administrative interface to an executing instance of the POS administrative interface for processing.

9. The method of claim 8 further comprising, updating views rendered by the executing instance within the POS interface rendered within the GUI.

10. The method of claim 1, wherein rending further includes permitting interactions within the GUI with the administrative interface and relaying the interactions to an executing instance of the POS administrative interface for processing.

* * * * *